US008662172B2

(12) United States Patent
Panga et al.

(10) Patent No.: US 8,662,172 B2
(45) Date of Patent: Mar. 4, 2014

(54) METHODS TO GRAVEL PACK A WELL USING EXPANDING MATERIALS

(75) Inventors: Mohan K. R. Panga, Staffod, TX (US); Nitin Y. Vaidya, Missouri City, TX (US); Bruno Drochon, Cambridge (GB); Juan-Carlos Santamaria, Houston, TX (US); Isabelle Couillet, Kuala Lumpur (MY); Peter J. Photos, El Campo, TX (US); John W. Still, Katy, TX (US); Balkrishna Gadiyar, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 400 days.

(21) Appl. No.: 12/758,155

(22) Filed: Apr. 12, 2010

(65) Prior Publication Data

US 2011/0247812 A1 Oct. 13, 2011

(51) Int. Cl.
*E21B 43/04* (2006.01)

(52) U.S. Cl.
USPC ............................................. 166/278; 166/51

(58) Field of Classification Search
USPC ................................................... 166/278, 51
See application file for complete search history.

(56) References Cited

U.S. PATENT DOCUMENTS

| | | | |
|---|---|---|---|
| 2,193,775 A | 3/1940 | Stratford | |
| 2,513,944 A | 7/1950 | Kessler | |
| RE24,570 E | 11/1958 | Mangold et al. | |
| 2,905,245 A | 9/1959 | De Priester | |
| 3,362,475 A | 1/1968 | Huitt et al. | |
| 3,434,540 A | 3/1969 | Stein | |
| 3,675,717 A | 7/1972 | Goins, Jr. et al. | |
| 3,887,474 A | 6/1975 | Senfe et al. | |
| 3,937,283 A | 2/1976 | Blauer et al. | |
| 4,051,900 A | 10/1977 | Hankins | |
| 4,387,769 A | 6/1983 | Erbstoesser et al. | |
| 4,506,734 A | 3/1985 | Nolte | |
| 4,526,695 A | 7/1985 | Erbstoesser et al. | |
| 4,606,407 A | 8/1986 | Shu | |

(Continued)

FOREIGN PATENT DOCUMENTS

| | | |
|---|---|---|
| EP | 1236701 | 9/2002 |
| EP | 2473705 | 7/2012 |

(Continued)

OTHER PUBLICATIONS

Kirk-Othmer Encyclopedia of Chemical Technology, vol. 17, pp. 143-167 (1982), "Petroleum (Drilling Fluids)".

(Continued)

*Primary Examiner* — David Andrews
*Assistant Examiner* — Michael Wills, III
(74) *Attorney, Agent, or Firm* — David G. Matthews; Brandon S. Clark; Daniel N. Lundeen (57) ABSTRACT

A method for treating a subterranean formation penetrated by a wellbore comprising combining a carrier fluid, a first amount of particulates, and a second amount of particulates into a slurry, wherein the first amount of particulates have a first average size distribution and the second amount of particulates have a second average size distribution, wherein at least one of the first amount of particulates and the second amount of particulates comprise an expanding material, placing the slurry in the wellbore, and lowering a screen into the slurry.

27 Claims, 7 Drawing Sheets

(56) References Cited

U.S. PATENT DOCUMENTS

| | | |
|---|---|---|
| 4,665,988 A | 5/1987 | Murphey et al. |
| 4,670,166 A | 6/1987 | McDougall et al. |
| 4,718,490 A | 1/1988 | Uhri |
| 4,738,897 A | 4/1988 | McDougall et al. |
| 4,785,884 A | 11/1988 | Armbruster |
| 4,848,467 A | 7/1989 | Cantu et al. |
| 4,867,241 A | 9/1989 | Strubhar |
| 4,883,124 A | 11/1989 | Jennings, Jr. |
| 4,917,185 A | 4/1990 | Jennings, Jr. et al. |
| 4,951,751 A | 8/1990 | Jennings, Jr. |
| 4,957,165 A | 9/1990 | Cantu et al. |
| 4,968,353 A | 11/1990 | Kawasaki et al. |
| 4,968,354 A | 11/1990 | Nishiura et al. |
| 4,977,961 A | 12/1990 | Avasthi |
| 4,986,355 A | 1/1991 | Casad et al. |
| 5,036,920 A | 8/1991 | Cornette et al. |
| 5,095,987 A | 3/1992 | Weaver et al. |
| 5,161,618 A | 11/1992 | Jones et al. |
| 5,188,837 A | 2/1993 | Domb |
| 5,238,067 A | 8/1993 | Jennings, Jr. |
| 5,325,921 A | 7/1994 | Johnson et al. |
| 5,330,005 A | 7/1994 | Card et al. |
| 5,332,037 A | 7/1994 | Schmidt et al. |
| 5,333,689 A | 8/1994 | Jones et al. |
| 5,415,228 A | 5/1995 | Price et al. |
| 5,439,055 A | 8/1995 | Card et al. |
| 5,492,178 A | 2/1996 | Nguyen et al. |
| 5,501,274 A | 3/1996 | Nguyen et al. |
| 5,501,275 A | 3/1996 | Card et al. |
| 5,507,342 A | 4/1996 | Copeland et al. |
| 5,518,996 A | 5/1996 | Maroy et al. |
| 5,551,516 A | 9/1996 | Norman et al. |
| 5,629,271 A | 5/1997 | Dobson, Jr. et al. |
| 5,713,416 A | 2/1998 | Chatterji et al. |
| 5,741,758 A | 4/1998 | Pakulski |
| 5,893,416 A | 4/1999 | Read |
| 5,908,073 A | 6/1999 | Nguyen et al. |
| 5,922,652 A | 7/1999 | Kowalski et al. |
| 5,934,376 A | 8/1999 | Nguyen et al. |
| 5,964,291 A | 10/1999 | Bourne et al. |
| 5,979,557 A | 11/1999 | Card et al. |
| 6,059,034 A | 5/2000 | Rickards et al. |
| 6,114,410 A | 9/2000 | Betzold |
| 6,172,011 B1 | 1/2001 | Card et al. |
| 6,209,643 B1 | 4/2001 | Nguyen et al. |
| 6,209,646 B1 | 4/2001 | Reddy et al. |
| 6,239,183 B1 | 5/2001 | Farmer et al. |
| 6,258,859 B1 | 7/2001 | Dahayanake et al. |
| 6,279,656 B1 | 8/2001 | Sinclair et al. |
| 6,302,207 B1 | 10/2001 | Nguyen et al. |
| 6,326,335 B1 | 12/2001 | Kowalski et al. |
| 6,328,105 B1 | 12/2001 | Betzold |
| 6,330,916 B1 | 12/2001 | Rickards et al. |
| 6,379,865 B1 | 4/2002 | Mao et al. |
| 6,380,136 B1 | 4/2002 | Bates et al. |
| 6,435,277 B1 | 8/2002 | Qu et al. |
| 6,439,309 B1 | 8/2002 | Matherly et al. |
| 6,446,722 B2 * | 9/2002 | Nguyen et al. ............... 166/278 |
| 6,482,517 B1 | 11/2002 | Anderson |
| 6,506,710 B1 | 1/2003 | Hoey et al. |
| 6,543,538 B2 | 4/2003 | Tolman et al. |
| 6,559,245 B2 | 5/2003 | Mao et al. |
| 6,599,863 B1 | 7/2003 | Palmer et al. |
| 6,656,265 B1 | 12/2003 | Garnier et al. |
| 6,703,352 B2 | 3/2004 | Dahayanake et al. |
| 6,719,054 B2 | 4/2004 | Cheng et al. |
| 6,723,683 B2 | 4/2004 | Crossman et al. |
| 6,725,930 B2 | 4/2004 | Boney et al. |
| 6,742,590 B1 | 6/2004 | Nguyen |
| 6,776,235 B1 | 8/2004 | England |
| 6,818,594 B1 | 11/2004 | Freeman et al. |
| 6,828,280 B2 | 12/2004 | England et al. |
| 6,860,328 B2 | 3/2005 | Gonzalez et al. |
| 6,874,578 B1 | 4/2005 | Garnier et al. |
| 6,877,560 B2 | 4/2005 | Nguyen et al. |
| 6,938,693 B2 | 9/2005 | Boney et al. |
| 6,989,195 B2 | 1/2006 | Anderson |
| 7,004,255 B2 | 2/2006 | Boney |
| 7,028,775 B2 | 4/2006 | Fu et al. |
| 7,044,220 B2 | 5/2006 | Nguyen et al. |
| 7,044,224 B2 | 5/2006 | Nguyen |
| 7,049,272 B2 | 5/2006 | Sinclair et al. |
| 7,060,661 B2 | 6/2006 | Dobson, Sr. et al. |
| 7,066,260 B2 | 6/2006 | Sullivan et al. |
| 7,084,095 B2 | 8/2006 | Lee et al. |
| 7,148,184 B2 | 12/2006 | Francini et al. |
| 7,166,560 B2 | 1/2007 | Still et al. |
| 7,178,596 B2 | 2/2007 | Blauch et al. |
| 7,213,651 B2 | 5/2007 | Brannon et al. |
| 7,219,731 B2 | 5/2007 | Sullivan et al. |
| 7,237,610 B1 | 7/2007 | Saini et al. |
| 7,261,157 B2 | 8/2007 | Nguyen et al. |
| 7,265,079 B2 | 9/2007 | Willberg et al. |
| 7,267,170 B2 | 9/2007 | Mang et al. |
| 7,275,596 B2 | 10/2007 | Willberg et al. |
| 7,284,611 B2 | 10/2007 | Reddy et al. |
| 7,290,615 B2 | 11/2007 | Christanti et al. |
| 7,294,347 B2 | 11/2007 | Menjoge et al. |
| 7,303,018 B2 | 12/2007 | Cawiezel et al. |
| 7,373,991 B2 | 5/2008 | Vaidya et al. |
| 7,398,826 B2 | 7/2008 | Hoefer et al. |
| 7,405,183 B2 | 7/2008 | Hanes, Jr. |
| 7,419,937 B2 | 9/2008 | Rimmer et al. |
| 7,451,812 B2 | 11/2008 | Cooper et al. |
| 7,482,309 B2 * | 1/2009 | Ravi et al. .................... 507/125 |
| 7,482,311 B2 | 1/2009 | Willberg et al. |
| 7,493,955 B2 | 2/2009 | Gupta et al. |
| 7,510,009 B2 | 3/2009 | Cawiezel et al. |
| 7,528,096 B2 | 5/2009 | Brannon et al. |
| 7,543,640 B2 * | 6/2009 | MacDougall .................. 166/278 |
| 7,559,369 B2 | 7/2009 | Roddy et al. |
| 7,565,929 B2 | 7/2009 | Bustos et al. |
| 7,581,590 B2 | 9/2009 | Lesko et al. |
| 7,624,802 B2 * | 12/2009 | McCrary et al. ........... 166/280.2 |
| 7,644,761 B1 | 1/2010 | Gu et al. |
| 7,784,541 B2 | 8/2010 | Hartman et al. |
| 7,789,146 B2 | 9/2010 | Panga et al. |
| 7,806,182 B2 | 10/2010 | Waters et al. |
| 7,833,947 B1 | 11/2010 | Kubala |
| 7,923,415 B2 | 4/2011 | Panga et al. |
| 7,931,088 B2 | 4/2011 | Stegemoeller et al. |
| 7,954,548 B2 | 6/2011 | Curimbaba et al. |
| 7,973,991 B2 | 7/2011 | Watanabe |
| 8,008,234 B2 | 8/2011 | Panga et al. |
| 8,119,574 B2 | 2/2012 | Panga et al. |
| 8,167,043 B2 | 5/2012 | Willberg et al. |
| 8,210,249 B2 | 7/2012 | Panga et al. |
| 2003/0134751 A1 | 7/2003 | Lee et al. |
| 2004/0060702 A1 | 4/2004 | Kotlar et al. |
| 2004/0074646 A1 | 4/2004 | Kotlar et al. |
| 2004/0106525 A1 | 6/2004 | Willberg et al. |
| 2004/0152601 A1 | 8/2004 | Still et al. |
| 2004/0209780 A1 | 10/2004 | Harris et al. |
| 2004/0261993 A1 | 12/2004 | Nguyen |
| 2004/0261995 A1 | 12/2004 | Nguyen et al. |
| 2004/0261996 A1 | 12/2004 | Munoz, Jr. et al. |
| 2005/0027499 A1 | 2/2005 | Bourbiaux et al. |
| 2005/0103496 A1 | 5/2005 | Todd et al. |
| 2005/0130845 A1 | 6/2005 | Freeman et al. |
| 2005/0130848 A1 | 6/2005 | Todd et al. |
| 2005/0161220 A1 | 7/2005 | Todd et al. |
| 2005/0172699 A1 | 8/2005 | Lin et al. |
| 2005/0233895 A1 | 10/2005 | Mertens et al. |
| 2005/0252651 A1 * | 11/2005 | Bosma et al. .................... 166/51 |
| 2005/0252659 A1 | 11/2005 | Sullivan et al. |
| 2006/0006539 A1 | 1/2006 | Matsui et al. |
| 2006/0048943 A1 | 3/2006 | Parker et al. |
| 2006/0048944 A1 | 3/2006 | van Batenburg et al. |
| 2006/0052251 A1 | 3/2006 | Anderson et al. |
| 2006/0054324 A1 | 3/2006 | Sullivan et al. |
| 2006/0058197 A1 | 3/2006 | Brown et al. |
| 2006/0073980 A1 | 4/2006 | Brannon et al. |
| 2006/0113078 A1 | 6/2006 | Nguyen et al. |
| 2006/0124302 A1 | 6/2006 | Gupta et al. |

(56) References Cited

U.S. PATENT DOCUMENTS

| | | |
|---|---|---|
| 2006/0151173 A1 | 7/2006 | Slabaugh et al. |
| 2006/0157243 A1 | 7/2006 | Nguyen |
| 2006/0175059 A1 | 8/2006 | Sinclair et al. |
| 2006/0185848 A1 | 8/2006 | Surjaatmadja et al. |
| 2006/0289160 A1 | 12/2006 | van Batenburg et al. |
| 2007/0017675 A1* | 1/2007 | Hammami et al. ........... 166/278 |
| 2007/0029086 A1 | 2/2007 | East, Jr. |
| 2007/0039733 A1 | 2/2007 | Welton et al. |
| 2007/0042912 A1 | 2/2007 | Welton et al. |
| 2007/0044963 A1* | 3/2007 | MacDougall ................. 166/278 |
| 2007/0238623 A1 | 10/2007 | Saini et al. |
| 2008/0000391 A1 | 1/2008 | Drochon |
| 2008/0000638 A1 | 1/2008 | Burukhin et al. |
| 2008/0053657 A1 | 3/2008 | Alary et al. |
| 2008/0066910 A1 | 3/2008 | Alary et al. |
| 2008/0093073 A1 | 4/2008 | Bustos et al. |
| 2008/0103065 A1 | 5/2008 | Reddy et al. |
| 2008/0108520 A1 | 5/2008 | Fu |
| 2008/0121395 A1 | 5/2008 | Reddy et al. |
| 2008/0135245 A1* | 6/2008 | Smith et al. ................. 166/280.2 |
| 2008/0135250 A1 | 6/2008 | Bosma et al. |
| 2008/0210423 A1 | 9/2008 | Boney |
| 2008/0280788 A1 | 11/2008 | Parris et al. |
| 2008/0280790 A1 | 11/2008 | Mirakyan et al. |
| 2008/0314594 A1 | 12/2008 | Still et al. |
| 2008/0318026 A1 | 12/2008 | Dai et al. |
| 2009/0008095 A1 | 1/2009 | Duncum et al. |
| 2009/0025394 A1 | 1/2009 | Bonzani et al. |
| 2009/0025932 A1* | 1/2009 | Panga et al. .................... 166/278 |
| 2009/0025934 A1 | 1/2009 | Hartman et al. |
| 2009/0107671 A1 | 4/2009 | Waters et al. |
| 2009/0294126 A1 | 12/2009 | Dalrymple et al. |
| 2010/0000735 A1 | 1/2010 | Weaver et al. |
| 2010/0087341 A1 | 4/2010 | Alary et al. |
| 2010/0087342 A1 | 4/2010 | Alary et al. |
| 2010/0089580 A1 | 4/2010 | Brannon et al. |
| 2010/0126722 A1* | 5/2010 | Cornelissen et al. ......... 166/278 |
| 2010/0200247 A1 | 8/2010 | Dybevik et al. |
| 2010/0300688 A1 | 12/2010 | Panga et al. |
| 2011/0005760 A1 | 1/2011 | Hartman et al. |
| 2011/0036577 A1 | 2/2011 | Barmatov et al. |
| 2011/0053813 A1 | 3/2011 | Panga et al. |
| 2011/0098202 A1 | 4/2011 | James et al. |
| 2011/0155371 A1 | 6/2011 | Panga et al. |
| 2011/0155372 A1 | 6/2011 | Panga et al. |
| 2011/0198089 A1 | 8/2011 | Panga et al. |
| 2011/0247812 A1 | 10/2011 | Panga et al. |
| 2012/0000641 A1 | 1/2012 | Panga et al. |
| 2012/0000651 A1 | 1/2012 | Panga et al. |
| 2012/0132421 A1 | 5/2012 | Loiseau et al. |
| 2012/0138296 A1 | 6/2012 | Panga et al. |
| 2012/0247764 A1 | 10/2012 | Chen et al. |
| 2012/0305254 A1 | 12/2012 | Chen et al. |

FOREIGN PATENT DOCUMENTS

| | | |
|---|---|---|
| GB | 2277543 | 11/1994 |
| RU | 2065442 | 8/1996 |
| RU | 2221130 | 1/2004 |
| RU | 2376451 | 12/2009 |
| RU | 2404359 | 11/2010 |
| RU | 2413064 | 2/2011 |
| RU | 2417243 | 4/2011 |
| SU | 1559116 | 4/1990 |
| SU | 1745891 | 7/1992 |
| WO | WO9930249 | 6/1999 |
| WO | WO2004007904 | 1/2004 |
| WO | WO2004038176 | 5/2004 |
| WO | WO2006082359 | 8/2006 |
| WO | WO 2008116899 * | 10/2008 |
| WO | WO2009013710 | 1/2009 |
| WO | WO2009088317 | 7/2009 |
| WO | WO2009106796 | 9/2009 |
| WO | WO 2009133438 A2 * | 11/2009 |
| WO | WO2009141749 | 11/2009 |
| WO | WO2010117547 | 10/2010 |
| WO | WO2011024100 | 3/2011 |
| WO | WO2011129937 | 10/2011 |
| WO | WO2011143055 | 11/2011 |
| WO | WO2012001574 | 1/2012 |

OTHER PUBLICATIONS

Kirk-Othmer Enclyclopedia of Chemical Technology, vol. 7, pp. 297-299 (1965).
SPE 131783—Less Sand May Not be Enough, M. Curry, T. Maloney, R. Woodroff, and R. Leonard, Feb. 23-25, 2010, SPR Unconventional Gas Conference, Pittsburg, PA, USA.
ARMA/USRMS 05-780—Experiments and numerical simulation of hydraulic fracturing in naturally fractured rock, C.J. De Pater and L.J.L. Beugelsdijk, Jun. 25-29, 2010, The 40th U.S. Symposium of Rock Mechanics (USRMS), Anchorage, AK, USA.
Nolte, K.G.: "Application of Fracture Design Based on Pressure Analysis," SPE13393—SPE Production Engineering, vol. 3, No. 1, 31-42, Feb. 1988.
Nolte, K.G. and Smith, M.B.: "Interpretation of Fracturing Pressures,"—SPE8297—JPT, vol. 12, No. 8, pp. 1767-1775, Sep. 1981.
Smith, M.B., Miller II, W.K., and Haga, J.: "Tip Screenout Fracturing: A Technique for Soft, Unstable Formations," SPE13273—SPE Production Engineering, vol. 2, No. 2, 95-103, May 1987.
Asgian, M.I., Cundall, P.A., and Brady, B.H. (1995) "Mechanical Stability of Porpped Hydraulic Fractures: A Numerical Study",—SPE28510—JPT, 203-208, Mar. 1995.
Milton-Tayler, D., Stephenson, C., and Asgian, M. (1992) "Factors Affecting the Stability of Proppant in Propped Fractures: Results of a Laboratory Study," paper SPE 24821 presented at the SPE Annual Technical Conference and Exhibition, Washington, DC, Oct. 4-7.
Desroches, J., et al. (1993) On the Modeling of Near Tip Processes in Hydraulic Fractures. International journal of rock mechanics and mining sciences & geomechanics abstracts, 30(7): p. 1127-1134.
Desroches, J., et al. (1994) The Crack Tip Region in Hydraulic Fracturing. Proc. R. Soc. Lond. A, 447: p. 39-48.
Schlumberger CemCRETE Brochure (2003).
Schlumberger Cementing Services and Products—Materials, pp. 39-76 (2012).
SPE 119366—Fracture Design Considerations in Horizontal Wells Drilled in Unconventional Gas Reservoirs; Cipolla, C.L., Lolon, E.P., Mayerhofer, M.J., and Warpinski, N.R. (2009).
Economides M.J. and Nolte K.G., Reservoir Stimulation, John Wiley and Sons, Ltd, 3rd Edition New York, 2000—Chapter 10, "Fracture Treatment Design" by Jack Elbel and Larry Britt, (pp. 10-1 to 10-50).
Economides M.J. and Nolte K.G., Reservoir Stimulation, John Wiley and Sons, Ltd, 3rd Edition New York, 2000—Chapter 8, "Performance of Fracturing Materials" by V.G Constien et al., (pp. 8-1 to 8-26).
Economides M.J. and Nolte K.G., Reservoir Stimulation, John Wiley and Sons, Ltd, 3rd Edition New York, 2000—Chapter 5, "Basics of Hydraulic Fracturing" by M.B.Smith and J.W. Shlyapobersky, (pp. 5-1 to 5-28).
Economides M.J. and Nolte K.G., Reservoir Stimulation, John Wiley and Sons, Ltd, 3rd Edition New York, 2000—Chapter 7, "Fracturing Fluid Chemistry and Proppants" by Janet Gulbis and Richard M.Hogde, (pp. 7-1 to 7-23).
Advances in Polymer Science, vol. 157, entitled "Degradable Aliphatic Polyesters," edited by A.C. Albertson (2002), pp. 1-138.
International Search Report and Written Opinion issued in PCT/US2011/028391 on Oct. 20, 2011, 9 pages.

* cited by examiner

METHODS TO GRAVEL PACK A WELL USING EXPANDING MATERIALS

FIELD OF THE INVENTION

The present invention relates to techniques for sand control. More particularly, it relates to gravel packing with low fluid damage.

BACKGROUND

The statements in this section merely provide background information related to the present disclosure and may not constitute prior art.

Sand production from oil/gas bearing formations can create several problems including accumulation in surface facilities, wellbore collapse and erosion of equipment such as screens, safety valves, and tubulars etc. To control sand production, a gravel pack is typically placed in the annulus of the screen and the formation/casing. It is necessary to have a tight gravel pack that occupies the entire volume of the annulus without any voids. If voids are present, the gravel can shift and rearrange around the screen during production leading to a potential exposure of the screen to the formation sand. This could result in local erosion of the screen known as hot spot through which sand can enter the production tubing. In vertical and deviated wells (<6° from vertical), gravitational force assists in achieving a tight gravel pack. However, in highly deviated (>6°°, angle of repose) and horizontal wells, achieving a tight gravel pack is difficult as the sand settles out of the fluid before it is carried to the bottom of the annulus. Gravel packs are placed in wellbores between a screen and a formation face and/or casing to prevent formation sand from flowing into the wellbore and to improve wellbore and near-wellbore conductivity. The conductivity at the wellbore and near-wellbore is important because any damage in these locations significantly increases the pressure drop of fluid flow, thereby reducing the producibility or injectivity of the well. Further, current placement techniques for gravel packs can be a complex procedure requiring several stages and the proper functioning of moving parts in a hostile wellbore environment.

There are two methods commonly used to gravel pack in horizontal wells, an alpha-beta technique using brine as a carrier fluid and a viscous packing method using a viscous fluid as a carrier fluid. Recently, a third method was developed wherein gravel is carried using a fluid containing multimodal particle size distribution with degradable particles. In all the three methods, filling greater than 90 percent of the annular volume with gravel is difficult. In the third method, filling greater than 80 percent of the annular volume is a challenging because of the volume change that occurs when the degradable particles transform from a solid to a liquid state. Embodiments of this invention relate to a method to compensate for the volume change and also to occupy any voids that are left in the gravel pack.

SUMMARY

Embodiments of the invention relate to an apparatus and a method for treating a subterranean formation penetrated by a wellbore comprising combining a carrier fluid, a first amount of particulates, and a second amount of particulates into a slurry, wherein the first amount of particulates have a first average size distribution and the second amount of particulates have a second average size distribution, wherein the first amount of particulates comprise an expanding material, placing the slurry in the wellbore, and lowering a screen into the slurry. Embodiments of the invention relate to an apparatus and a method of treating a subterranean formation penetrated by a wellbore, the method comprising combining a carrier fluid, a first amount of particulates, a second amount of particulates, and a third amount of particulates into a slurry, wherein the first amount of particulates have a first average size distribution, the second amount of particulates have a second average size distribution, and the third amount of particulates have a third average size distribution, wherein the first average size distribution is at least two times larger than the second average size distribution, and wherein second average size distribution is at least two times larger than the third average size distribution, wherein at least one of the second amount of particulates and the third amount of particulates comprise a expanding material, positioning a screen in a wellbore, and circulating the slurry through the wellbore such that the first amount of particulates and the second amount of particulates are deposited on an outer surface of the screen.

BRIEF DESCRIPTION OF THE DRAWINGS

For a more complete understanding of the present invention, and the advantages thereof, reference is now made to the following descriptions taken in conjunction with the accompanying figures.

DETAILED DESCRIPTION

At the outset, it should be noted that in the development of any actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the compositions used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all points within the range are to be considered to have been specified, and that inventors possessed knowledge of the entire range and all points within the range.

Embodiments of the present invention relate to methods to gravel pack or fracture and pack a well using a slurry that contains a high fraction of solids. The solids in the slurry were chosen such that the dry blend of solids will have a maximum packing volume fraction (i.e., the particles pack with minimum void space between them). This is often accomplished by choosing particles with different particle size distributions with the average particle size of each distribution being 2 to 10 times smaller than the average particle size of the next larger distribution. The solids are held in suspension because of hindered settling. To use this slurry for gravel packing/frac packing, one or more particle size distributions may comprise degradable particles so that the pack will have a high permeability after placing it downhole. If degradable particles are not present the smaller particles will block the void spaces in the pack thereby decreasing the permeability.

One of the limitations with using degradable particles in a slurry is that the solid volume decreases when the degradable/dissolvable particles change to a liquid state. The gravel pack occupies only 75% to 80% of the total volume of the slurry at the end of the gravel pack treatment. This can lead to a situation where the annular volume is not completely occupied with gravel which can result in hot spots. Compositions and methods are disclosed to increase the volume of the gravel pack to occupy the voids in the annular space of the screen and the formation.

Figure 1:
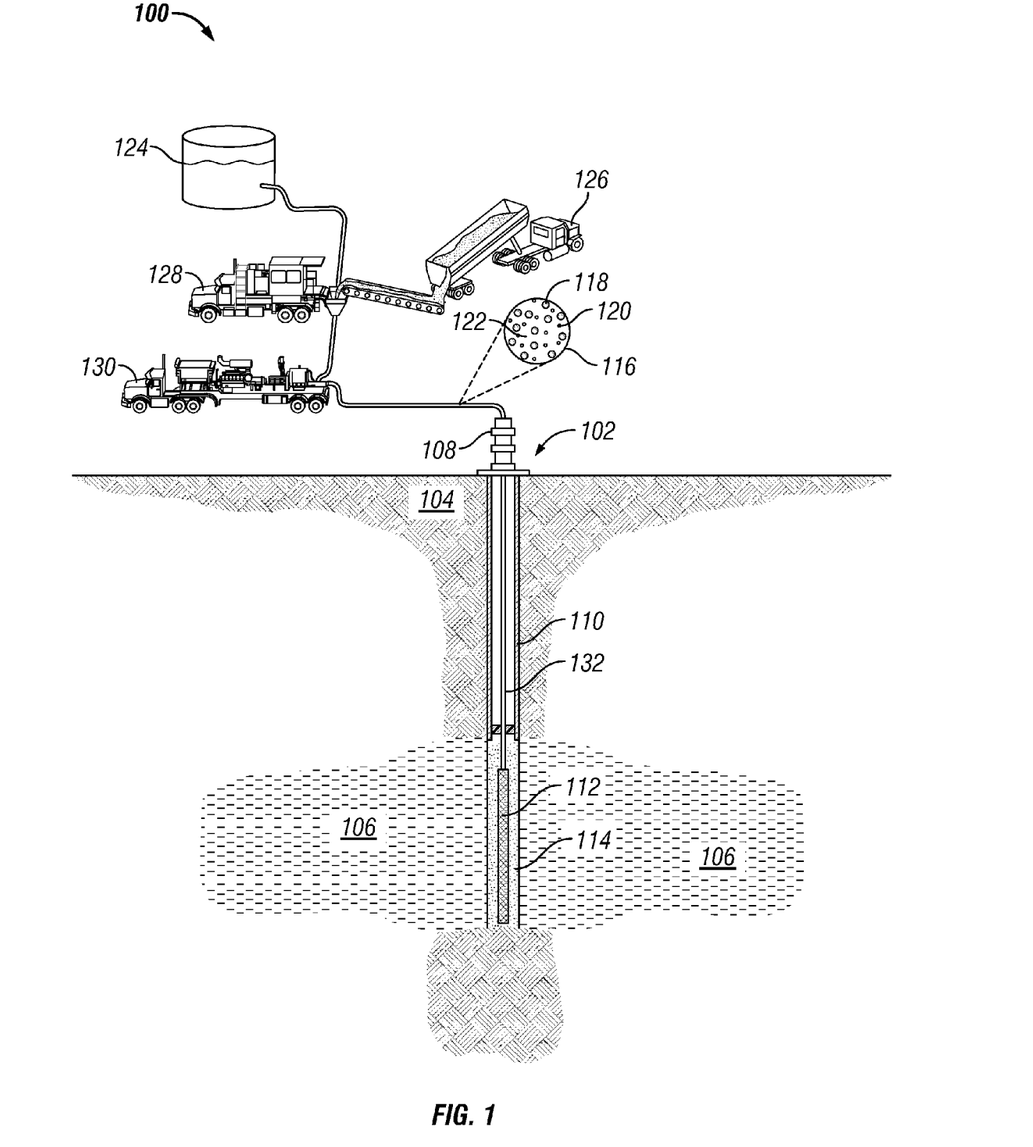
FIG. 1 is a schematic diagram of a system for low damage gravel packing.

FIG. 1 is a schematic diagram of a system 100 for low damage gravel packing. In certain embodiments, the system 100 includes a well 102 drilled through an overburden 104 and a formation of interest 106. The formation of interest 106 may include a hydrocarbon producing formation, a water producing formation, a target formation for injection of a fluid, or other formation of interest. In certain embodiments, the well 102 has a wellhead 108, and a casing 110 covering at least a portion of the wellbore. In FIG. 1, the wellbore through the formation of interest 106 is an "open hole" completion in a vertical well. Other types of completions are contemplated by this application, including, without limitation, a cased completion, multiple zone completions, and/or a horizontal well or well segment. The casing 110 may include a cement layer (not shown) between the casing 110 and the formation(s) (104, 106). Various other features of the system 100 that are known in the art are not illustrated herein to avoid obscuring embodiments of the invention.

The system 100 further includes, in some embodiments, a screen 112 disposed in the wellbore. The screen 112 may include slots or holes sized to prevent the flow of particles from the formation of interest 106 into the well 102 or to the surface during treatment flowback or production of the well 102. In some embodiments, the system 100 includes a gravel pack 114 deposited between the screen 112 and the formation of interest 106. The gravel of the gravel pack 114 may be deposited as a portion of a slurry 116 comprising particles (118, 120) and a carrier fluid 122.

In some embodiments, the slurry 116 includes a first amount of particulates 118 having a first average size distribution and a second amount of particulates 120 having a second average size distribution. In some embodiments, the first amount of particulates 118 are non-deformable particulates. The average size distribution is determined according to any method understood in the art, at least including a mesh screen size number (e.g. 20/40 sand), a mean particle size, and a median particle size. The average size distributions of the first amount of particulates 118 and the second amount of particulates 120 are selected such that the first average size distribution is between two and fifteen times larger than the second average size distribution. The average size distributions of the first amount of particulates 118 and the second amount of particulates 120 are further selected to prevent migration of formation fines through the gravel pack 114 into the well 102.

In some embodiments, the slurry 116 includes a third amount of particulates (not shown—see FIGS. 5 and 6 and referencing text for examples) having a third average size distribution, where the second average size distribution is between two and fifteen times larger than the third size distribution. For example, the first average size distribution may be a median size of about 840 μm (micrometer, m-6), the second average size distribution may be a median size of about 150 μm, and the third average size distribution may be a median size of about 15 μm.

In some embodiments, the slurry 116 includes a fourth and/or a fifth amount of particulates (not shown). The fourth amount of particulates includes a fourth average size distribution that is between two and fifteen times smaller than the third average size distribution. The fifth amount of particulates includes a fifth average size distribution that is between two and fifteen times smaller than the fourth average size distribution.

The median size used herein may be any value understood in the art, including for example and without limitation a diameter of roughly spherical particulates. In some embodiments, the median size may be a characteristic dimension, which may be a dimension considered most descriptive of the particles for specifying a size distribution range. In certain embodiments, the first amount of particulates has a characteristic dimension, for example and without limitation a median particle diameter, between about 500 μm and 1800 μm. In certain embodiments, the first amount of particulates includes a median particle volume between about $2*10^{-11}$ m$^3$ and $6*10^{-10}$ m$^3$. Other volume ranges will be functional according to the principles described herein, and all relevant values of particle sizes for gravel packing are contemplated herein.

In some embodiments, each median size is a characteristic dimension, where the ratio of characteristic dimensions between particle sizes (e.g. first amount of particulates compared to second amount of particulates) is proportional to a cube root of a ratio of average particle volumes between particle sizes. For example, the first amount of particulates may have a characteristic dimension of $1.5*10^{-3}$ m and an average particle volume of $5.63*10^{-10}$ m$^3$. The second amount of particulates in the example has an average particle volume between about $1.7*10^{-13}$ m$^3$ to $2.1*10^{-11}$ m$^3$, with a characteristic dimension between $1.0*10^{-4}$ m and $5.0*10^{-4}$ m which includes the range from one-third to one-fifteenth the characteristic dimension of the first amount of particulates.

The characteristic dimension is used herein to more clearly indicate that the size selection of the particles in the first and second (and/or third, fourth, and fifth) particulate amounts are independent of the shape of the particles. Therefore, the particle sizes can vary in each particle size step by two to fifteen times in any average linear measure, and/or by $2^3$ times to $15^3$ times (i.e. 8× to 3375×) in any average volumetric measure. The relative sizing of the particulates may meet either the linear criteria 2× to 15×, the volumetric criteria $2^3$× and $15^3$× or both. In certain embodiments, utilizing a narrower range of 5× to 10× (characteristic dimension or linear measure) provides greater settling time improvement and therefore allows higher particulate loadings and/or lower carrier fluid 122 viscosities.

The carrier fluid 122 may be a brine, a fluid including a hydratable gel (e.g. a guar, other polysaccharide, hydroxyethyl-cellulose "HEC," or other gelling agent), an oil or oil-based gel, a viscoelastic surfactant, a fluid with a viscosifier, a foamed or "energized" fluid (e.g. a nitrogen or $CO_2$ based foam), an emulsion (including water or oil in the external phase), or other fluid known in the art. Some embodiments may use brine or an oil in water or a water in oil emulsion. In certain embodiments, the slurry 116 is pumped through the well 102 to deposit the first amount of particulates 118 and the second amount of particulates 120 between the screen 112 and the formation of interest 106. The slurry 116 may be pumped outside the screen 112 into the formation of interest 106 until a screen-out occurs (i.e. the particulates 118, 120 build up to the point where the pressure drop across the gravel pack 114 prevents further pumping), the slurry 116 may be circulated through the well 102 such that the slurry 116 passes from outside the screen 112 to inside the screen 112, thereby depositing the particulates 118, 120 between the screen 112 and the formation of interest 106 and circulating the carrier fluid 122 to the surface. In some embodiments, the slurry 116 may be placed in the wellbore 102 and the screen 112 lowered into the already-placed slurry 116 such that the particulates 118, 120 in the slurry 116 are thereby deposited between the screen 112 and the formation of interest 106.

In some embodiments, the mixing of particulates 118, 120 with size ratios as described herein allow high particulate loadings with a low or zero viscosifier loading. In some embodiments, the carrier fluid 122 includes a brine with no viscosifiers, and the sum of the mass of the particulates (i.e. the first amount, second amount, and/or third amount combined) is at least about 20 pounds per gallon of carrier fluid 122. In some embodiments, the carrier fluid includes a hydratable gelling agent present in an amount less than about 20 lb gel per 1000 gallons, for example less than 18 lb gel per 1000 gallons of carrier fluid, and the sum of the mass of the particulates exceeds about 23 pounds per gallon of carrier fluid 122. In some embodiments, the carrier fluid 122 includes a viscosifier present in an amount less than 20 lb per thousand gallons of carrier fluid 122, and the sum of the mass of the particulates exceeds about 23 pounds per gallon of carrier fluid 122. In some embodiments, the carrier fluid 122 includes a viscosifier present in an amount less than 20 lb per thousand gallons of carrier fluid 122, and the sum of the mass of the particulates exceeds about 30 pounds per gallon of carrier fluid 122.

The limits for minimum viscosifier loading and maximum particulate loading depend upon factors specific to each system 100. For example, the settling time of the particulates 118, 120 in the carrier fluid 122, the viscosity of the carrier fluid 122, the intended pumping rate of the slurry 116, the length of the screen 112 interval wherein the gravel pack 114 is to be placed, the fracture strength of the formation of interest 106, and other factors known to those of skill in the art all contribute to the viscosifier loading required in a particular application. Using only brine as a carrier fluid 122 with the layered particulate sizes 118, 120, including a third particulate size, slurries 116 have been developed with particulates exceeding 20 lb per gallon of carrier fluid 122, and in certain applications the particulates can exceed 30 lb per gallon of carrier fluid 122.

In some embodiments, at least one of the smaller particulate sizes (i.e. the second, third, fourth, and/or fifth amount of particulates) include a degradable material. The inclusion of degradable material allows the particulates to participate in improving suspension of particles in the slurry 116, while allowing the particles to be removed in the gravel pack 114 after placement, and/or to allow the particles to release beneficial chemicals into the gravel pack 114 after placement. For example, the degradation of the particulates may release chemicals that dissolve bridging agents, break crosslinked or polymer-based carrier fluid 122, and/or that attack a filter cake formed.

Examples of degradable materials include, without limitation, wax, oil-soluble resin, materials soluble in hydrocarbons, lactide, glycolide, aliphatic polyester, poly (lactide), poly (glycolide), poly (ε-caprolactone), poly (orthoester), poly (hydroxybutyrate), aliphatic polycarbonate, poly (phosphazene), poly (anhydride), poly (saccharide), dextran, cellulose, chitin, chitosan, protein, poly (amino acid), poly (ethylene oxide), and copolymers including poly (lactic acids) and poly (glycolic acids). In some embodiments, degradable materials may include a copolymer including a first moiety that is a hydroxyl group, a carboxylic acid group, and/or a hydrocarboxylic acid group, and a second moiety that is a glycolic acid and/or a lactic acid.

In some other embodiments, at least one of the smaller particulate sizes include a reactive solid that reacts with a hydrolysis product of a degradable material. For example, the second amount of particulates 120 may be a degradable material and the third amount of particulates may be a material that reacts with the hydrolysis product of the second amount of particulates 120, enhancing the rate of degradation of the second amount of particulates 120. In some embodiments, the reactive solid includes ground quartz, oil soluble resin, degradable rock salt, clay, and/or zeolite. In some embodiments, the reactive solid includes magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and/or sodium calcium magnesium polyphosphate glass. The degradable materials and reactive solids that enhance degradation may be stored on the same particle, such that reactions do not occur at the surface but begin within the fluids at downhole conditions.

In some embodiments, at least one of the amount of particulates (i.e. first through fifth) includes an encapsulated breaker that reduces the viscosity of the carrier fluid 122 after placement of the gravel pack 114 reducing permeability damage of the pack 114. In some embodiments, the carrier fluid 122 includes an emulsion, and at least one of the amount of particulates includes a chemical adapted to assist in breaking the emulsion. In some other embodiments, the chemical adapted to assist in breaking the emulsion is encapsulated and/or included on a coated particle, such that the chemical is not released to break the emulsion until after the gravel pack 114 is placed. In some further embodiments, one or more of the amount of particulates comprises coated particles, such that the particles do not begin to degrade and/or release chemicals, breakers, solvents, and/or surfactants until after the gravel pack 114 is placed. Any coating on a particle may be adapted to break down with time, temperature, fluids expected to be encountered in the wellbore, chemicals or reactive solids included on other particles and/or in the carrier fluid 122 that are released under other mechanisms.

In one exemplary embodiment, the carrier fluid 122 comprises an emulsion, the second amount of particulates includes a surfactant that breaks the emulsion and the second amount of particulates are coated with a material that breaks down in the presence of a chemical in the third amount of particulates. In the example, the third amount of particulates includes a coating that degrades in the presence of hydrocarbons (e.g. as produced from the formation of interest 106) that releases the chemical breaking down the coating on the second amount of particulates. Similar configurations of particles, coatings, chemicals, and the like are contemplated.

In some embodiments, the amount of particulates 118, 120 comprise particles having an aspect ratio of less than or equal to one. In some embodiments, particles with a lower aspect ratio have enhanced surface area per unit volume and enhance degradation and/or reaction rates for the particles. In some embodiments, the amount of particulates 118, 120 comprise particles having a nano-structure, micro-structure, or mesoporous structure that enhance the surface area of the particles. The structures of the particles may be fractal or non-fractal. In some embodiments, at least one of the particulates 118, 120 includes a tackifying agent such as a resin-coating.

In some embodiments, the system 100 includes various devices to control mixing and pumping the slurry 116. In one exemplary embodiment, the system 100 includes at least one fluid tank 124 which contains the carrier fluid 122 and/or a base fluid utilized in the creation of the carrier fluid 122. The exemplary embodiment further includes a gravel carrier 126 which, in one embodiment, provides the first amount of particulates 118 to a blending device 128. The blending device 128 prepares the final slurry 116, for example mixing the gravel fluid 122 and adding the first amount of particulates 118 from the gravel carrier 126, and further adding any additives, the second amount of particulates 120 and/or third amount of particulates. In certain embodiments, more than one particulate amount may be blended and added by the gravel carrier 126 or other device. The blending device 128 further provides the slurry 116 to a pumping device 130 that provides pressurized slurry 116 to the wellhead 108. Other equipment configurations are understood in the art and contemplated herein. For example, and without limitation, the system 100 may include a coiled tubing unit (not shown) in place of one or more pieces of equipment and/or the tubing 132.

Figure 2:
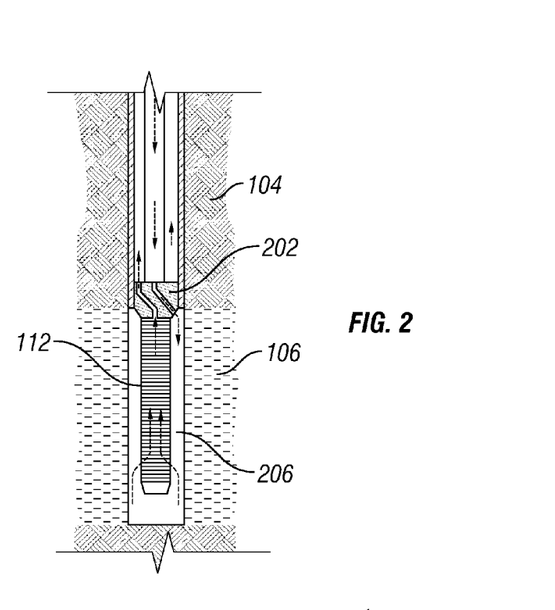
FIG. 2 is a schematic diagram of a device for depositing particulates between an outer surface of a screen and a surface of a wellbore formation.

FIG. 2 is a schematic diagram of a device for depositing particulates between an outer surface of a screen 112 and a surface of a formation of interest 106. FIGS. 1 and 2 show the slurry 116 is pumped through a crossover tool 202 from a tubing 132 to the screen 112 annulus. The carrier fluid 122 of the slurry 116 recirculates through the screen 112, depositing the particulates 118, 120 and returning to the surface through a tubing-casing annulus 206. Upon completion of placing the gravel pack 114, the crossover tool 202 is closed, replaced with a production packer (not shown), or subjected to other operations. The placement of the gravel pack 114 as shown in FIG. 2 is exemplary only.

Figure 3A:
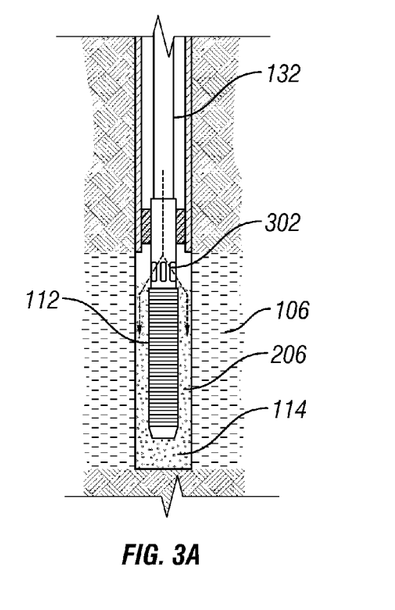
FIG. 3A is a schematic diagram of a device for depositing particulates between an outer surface of a screen and a surface of a wellbore formation in a first position.

FIG. 3A is a schematic diagram of a device for depositing particulates between an outer surface of a screen 112 and a surface of a formation of interest 106 in a first position. The screen 112 illustrated in FIG. 3A has slots 302 engageable from the surface in some manner. For example the slots 302 may be engageable through electronic signals, hydraulic signals, actuated through a wireline, actuated through force communicated through the tubing 132 (e.g. downward force, upward force, and/or rotational force), and/or through any other operations. In the first position as illustrated in FIG. 3A, the slots 302 are open allowing slurry to flow into the screen 112 annulus and thereby deposit particulates. As shown in FIG. 3A, the slurry carrier fluid flows into the formation of interest 106, typically at an injecting pressure below the fracturing pressure, until the gravel pack 114 is fully placed.

The arrangement illustrated in FIG. 3A is exemplary only. With some tools and arrangements the carrier fluid may be returned directly to the surface instead of being injected into the formation of interest 106. For example, the slurry may be pumped down the tubing-casing annulus 206, recirculated through the slots to tubing 132 and returned to the surface. Alternatively, the slurry may be pumped down the tubing 132, forced out of the slots and recirculated through the screen, crossing over into the tubing-casing annulus 206 and returning to the surface. Each of these arrangements is not shown in FIG. 3A to avoid obscuring aspects of the present application.

Figure 3B:
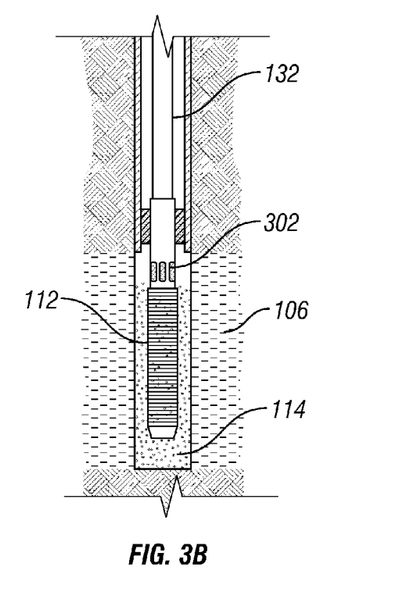
FIG. 3B is a schematic diagram of a device for depositing particulates between an outer surface of a screen and a surface of a wellbore formation in a second position.

FIG. 3B is a schematic diagram of a device for depositing particulates between an outer surface of a screen 112 and a formation of interest 106 in a second position. In the second position as illustrated in FIG. 3B, the slots 302 are closed preventing the flow of carrier fluid or slurry through the slots. In the embodiment illustrated in FIG. 3B, formation fluid coming from the formation of interest flows through the gravel pack 114 and screen 112, preventing sand or unconsolidated particulates from the formation of interest 106 from flowing into the wellbore or tubing 132. In the embodiment of FIG. 3B, any particles that may have settled inside the screen 112 may be cleaned out by recirculation (e.g. with a coiled tubing unit) and/or by entrainment within produced fluid from the formation of interest 106.

Figure 4A:
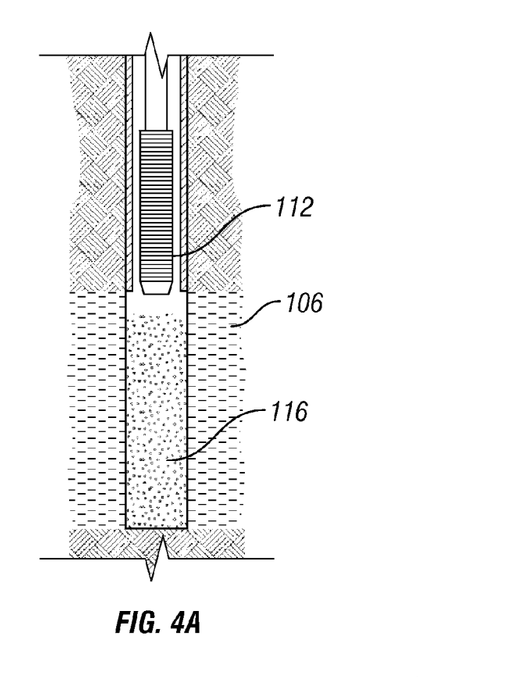
FIG. 4A is a schematic diagram of a device for depositing particulates between an outer surface of a screen and a surface of a wellbore formation in a first position.

FIG. 4A is a schematic diagram of a device for depositing particulates between an outer surface of a screen 112 and a formation of interest 106 in a first position. In the embodiment of FIG. 4A, a specified amount of slurry 116 is placed in the wellbore. The specified amount of slurry 116 depends upon the particulate loading of the slurry, the diameter of the wellbore, the length of the interval to be covered, the displacing volume of the screen 112 (which is lowered into the slurry 116), and similar parameters. In some embodiments, the slurry 116 placed at the bottom of the wellbore has a very high particulate loading, for example in excess of 30 lb of particulates per gallon of carrier fluid. The screen 112 in the first position includes the screen 112 not lowered into the slurry 116.

Figure 4B:
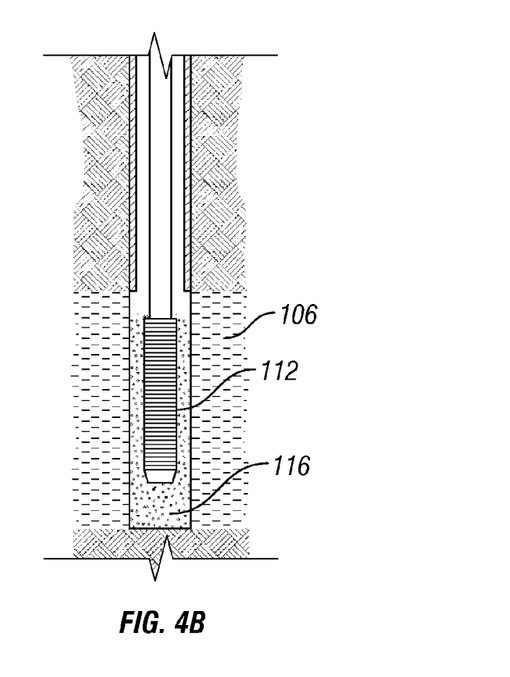
FIG. 4B is a schematic diagram of a device for depositing particulates between an outer surface of a screen and a surface of a wellbore formation in a second position.

FIG. 4B is a schematic diagram of a device for depositing particulates between an outer surface of a screen 112 and a formation of interest 106 in a second position. The screen 112 in the second position includes the screen 112 lowered into the slurry 116. In certain embodiments, the screen 112 may include centralizers such that the screen 112 is approximately centered in the wellbore. However, where the slurry 116 is dense from heavy particulate loading, the screen 112 tends to self-centralize and external centralizers may not be required.

Figure 4C:
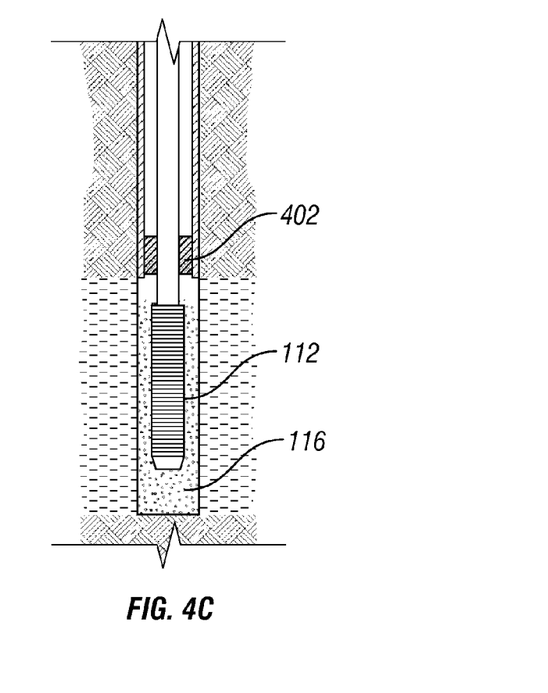
FIG. 4C is a schematic diagram of a device for depositing particulates between an outer surface of a screen and a surface of a wellbore formation in a third position.

FIG. 4C is a schematic diagram of a device for depositing particulates between an outer surface of a screen 112 and a formation of interest in a third position. In the third position, the screen 112 remains in the slurry 116, and production equipment (for example a production packer 402) is placed in the wellbore to prepare the system for production. In some embodiments, the well is shut in for a specified time period to allow particulates in the slurry 116 to settle, to allow degradable particulates to decompose completely or partially, to allow carrier fluid 122 breakers to act on the carrier fluid 122, and/or to allow particulates with tackifiers to cure (e.g. with resin-coated particulates).

Figure 5:
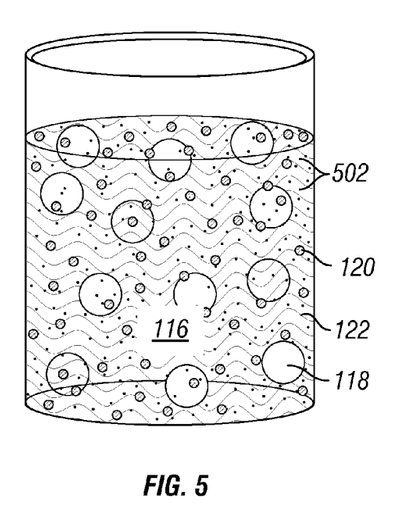
FIG. 5 is an illustration of a carrier fluid combined with a first, second, and third amount of particles in a slurry.

FIG. 5 is an illustration of a carrier fluid 122 combined with a first 118, second 120, and third 502 amount of particles in a slurry 116. As illustrated by FIGS. 1 and 5, the particulates 118, 120, 502 comprise three size regimes, wherein each size regime is two to fifteen times larger than the next smaller size regime. The inclusion of varying size particulates 118, 120, 502 with a high particulate loading creates a slurry 116 with greatly reduced settling times relative to a slurry 116 with a uniform particle size.

Further, the amount of carrier fluid 122 per unit volume of slurry 116 can be reduced dramatically. For example, spherical particles with a uniform packing arrangement create a packing volume fraction (PVF) of about 0.74, or about 74 percent of the slurry volume (where particles are suspended rather than dissolved) is particulate matter. Spherical particles with a random packing arrangement create a PVF of about 0.64. By contrast, an arrangement with three particulate sizes having average diameters, in one example, of 840 μm, 150 μm, and 15 μm, respectively, creates a mixture of particles having a PVF of about 0.87. The base densities of the particles 118, 120, 502 may be selected to create a final slurry 116 density at a selected value. An increase in PVF reduces the amount of carrier fluid 122 in the final slurry 116. For example, an increase from 0.64 (random packing) to just 0.80 reduces the amount of carrier fluid 122 in a gallon of slurry by over 50% (i.e. (36−20)/36). The reduced carrier fluid 122 amount reduces the amount of fluid placed in the formation of interest 106 and the amount of viscosifier (if any) in the gravel pack 114, all contributing to a reduction in permeability damage to the formation of interest 106 and a reduction in permeability damage to the gravel pack 114.

Figure 6:
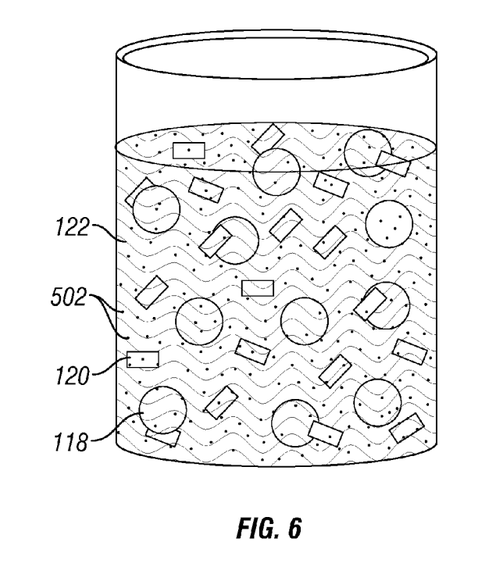
FIG. 6 is an illustration of a carrier fluid combined with a first, second, and third amount of particles in a slurry.

FIG. 6 is an illustration of a carrier fluid 122 combined with a first 118, second 120, and third 502 amount of particles in a slurry. In FIG. 6, the second amount of particulates 120 includes particulates having an aspect ratio of less than one. The aspect ratio may be defined in any direction desired. In the second amount of particles 120 in FIG. 6, the particles are elongated, but may comprise flakes, disks, ellipsoids, fibers, or any other particulate shapes known in the art. Any of the first amount of particulates 118, second amount of particulates 120, third amount of particulates 502, the fourth amount of particulates (not shown), and/or the fifth amount of particulates (not shown) may comprise a non-spherical shape. In certain embodiments, the first amount of particulates 118 comprise the primary particulate making up the "gravel," and the first amount of particulates 118 are approximately spherical to maximize permeability of the gravel pack 114.

In some embodiments, after the placement the concentration of solid phase in the slurry undergoes a change due to transformation of degradable solids to a liquid state. This will lead to a gravel pack with low pack efficiency. Pack efficiency is defined as the percentage of annular volume occupied by gravel. This process is illustrated in FIGS. 7(a), 7(b), and 7(c).

Figure 7A:
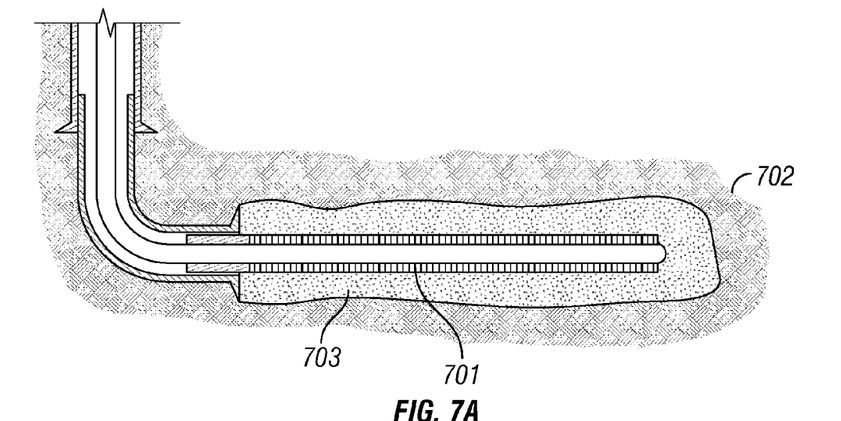
FIG. 7A is a schematic diagram of a device for depositing particulates between an outer surface of a screen and a surface of a wellbore formation using a slurry.
Figure 7B:
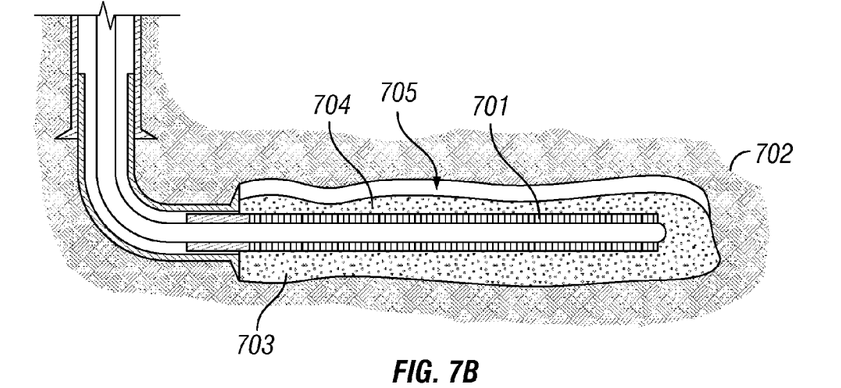
FIG. 7B is a schematic diagram of a device for depositing particulates between an outer surface of a screen and a surface of a wellbore formation with an exposed screen.
Figure 7C:
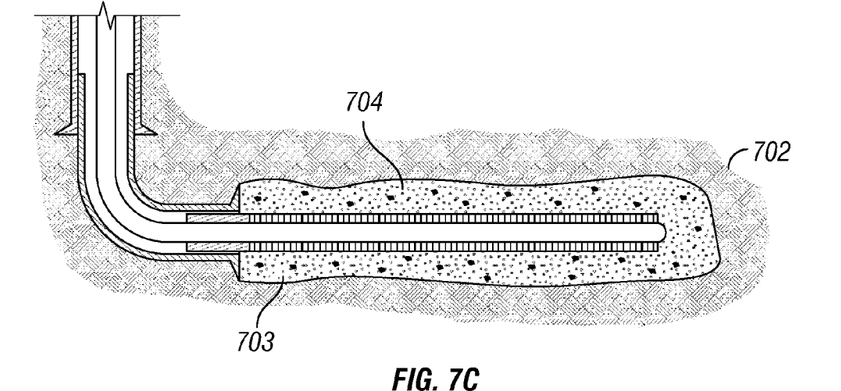
FIG. 7C is a schematic diagram of a device for depositing particulates between an outer surface of a screen and a surface of a wellbore formation using expanding materials.

FIG. 7(a) shows a schematic of a gravel pack 703 containing a high solids content slurry placed in the annulus of the screen 701 and the formation 702. FIG. 7(b) shows the gravel pack 703 after the degradable particles in the slurry change to a liquid state and the gravel present in the slurry settles around the screen 701 and forms a gravel pack 703 in the formation 702. The change in volume of the solid state resulting in an incomplete gravel pack 704 and resulting exposed screen 705 is also shown in the figure. FIG. 7(c) illustrates how expandable particles are used to increase the volume of the pack 703 to increase the pack efficiency. That is, the particles expand to fill voids in the incomplete gravel pack 704 so that the screen 701 is uniformly exposed to the gravel pack 703.

In some embodiments, a swellable elastomer is added to a brine based high solid content slurry. The slurry is placed in the annulus of the screen and the formation. After the placement, the elastomer swells during production when it comes in contact with the hydrocarbons. In addition, a hydrocarbon solvent can be circulated from the surface to ensure uniform and sufficient contact with the elastomer. As the elastomer swells, the volume of the gravel pack increases occupying the void spaces inside or above the pack. This concept can be extended to an oil based high solid content fluid where the additional step of contact with hydrocarbon based solvent is not necessary. Note that the slow rate of swelling at surface conditions allows the transport of these swellable materials. Once the slurry is placed downhole the elastomer swells at a much faster rate.

In some embodiments, this concept can be extended to a brine swellable elastomer added to brine or oil water based high solid content fluid. Examples of swellable elastomers include butadiene based polymers and copolymers such as styrene butadiene rubber (SBR), styrene butadiene block copolymers, styrene isoprene copolymer, acrylate elastomers, neoprene elastomers, nitrile elastomers, vinyl acetate copolymers and blends of EVA, and polyurethane elastomers. Examples of water and brine swellable elastomers include maleic acid grafted styrene butadiene elastomers and acrylic acid grafted elastomers.

In some embodiments, temperature expandable particles are added to the gravel pack slurry. After the slurry is placed in the annulus, the particle undergoes thermal expansion and occupies the voids in the annulus. Examples of such materials include metals and gas filled particles that expand when the particles are heated. An example for gas filled material is EXPANCEL™ microspheres that are manufactured by and commercially available from Akzo Nobel of Chicago, Ill. These microspheres contain a polymer shell with gas entrapped inside the cell. When these microspheres are heated the gas inside the shell expands and increases the size of the particle. The diameter of the particle can increase 4 times which could result in a volume increase by a factor of 64.

In some embodiments, a metal oxide is added to the high solid content fluid. The fluid is placed in the annulus of the screen and the formation. The metal oxide reacts with the water in the slurry generating metal hydroxide which has a lower density than the metal oxide. The metal hydroxide occupies more volume than the metal oxide thereby increasing the volume occupied by the pack. This concept can be extended to oxides of Ca, Mn, Ni, Fe, etc. Further examples of swellable inorganic materials can be found in PCT Application Publication Number WO 2009133438, which is hereby incorporated by reference in its entirety.

The oil swellable elastomer can be used in a particulate form where it comprises a part of the first or second particulates in the slurry. After the slurry is placed in the wellbore, the swellable particles expand after contact with a hydrocarbon. Further, the swellable particles can be coated with an acid or base reactive material or a temperature degradable material such as PLA or PGA to prevent premature swelling during the placement of gravel pack. After placement, the coating can be dissolved by contacting it with a base or acid.

Further, in some embodiments, the screen includes a crossover port, and the delivery of slurry includes positioning the screen in the wellbore, and placing the slurry through the crossover port into the annulus of the wellbore and the screen. In some embodiments, the slurry is placed in an annulus of the screen and the wellbore by circulating the slurry from the bottom of the screen into the screen-wellbore annulus. Some embodiments may benefit from contacting the slurry after it is placed with an oil or brine so to accelerate the swelling of the expandable elastomer.

The schematic flow diagram and related description which follows provides an illustrative embodiment of performing operations for low damage gravel packing Operations illustrated are understood to be exemplary only, and operations may be combined or divided, and added or removed, as well as re-ordered in whole or part, unless stated explicitly to the contrary herein.

Figure 8:
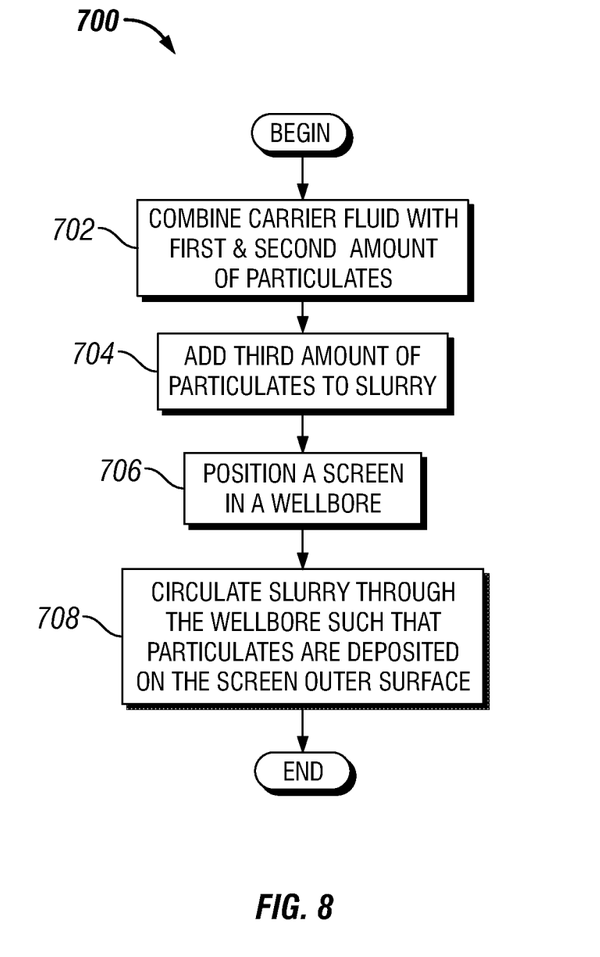
FIG. 8 is a schematic flow diagram of operations for low damage gravel packing.

FIG. 8 is a schematic flow diagram of a procedure 700 for low damage gravel packing. The procedure 700 includes an operation 702 to combine a carrier fluid, a first amount of particulates, and a second amount of particulates into a slurry, where the first amount of particulates have a first average size distribution and the second amount of particulates have a second average size distribution, where the first average size distribution is at least five times larger than the second average size distribution, and where the first amount of particulates comprise non-deformable particulates. In certain further embodiments, the procedure 700 includes an operation 704 to combine a third amount of particulates with the slurry, where the third amount of particulates have a third average size distribution, and where the second average size distribution is at least five times larger than the third average size distribution.

The method 700 further includes an operation 706 to position a screen in a wellbore, and an operation 708 to circulate slurry through the wellbore such that the first amount of particulates and the second amount of particulates are deposited on an outer surface of the screen. In certain embodiments, circulating the slurry through the wellbore comprises flowing the slurry into a formation of interest, and flowing the slurry back out of the formation of interest such that particulates from the slurry are deposited on the outer surface of the screen.

Figure 9:
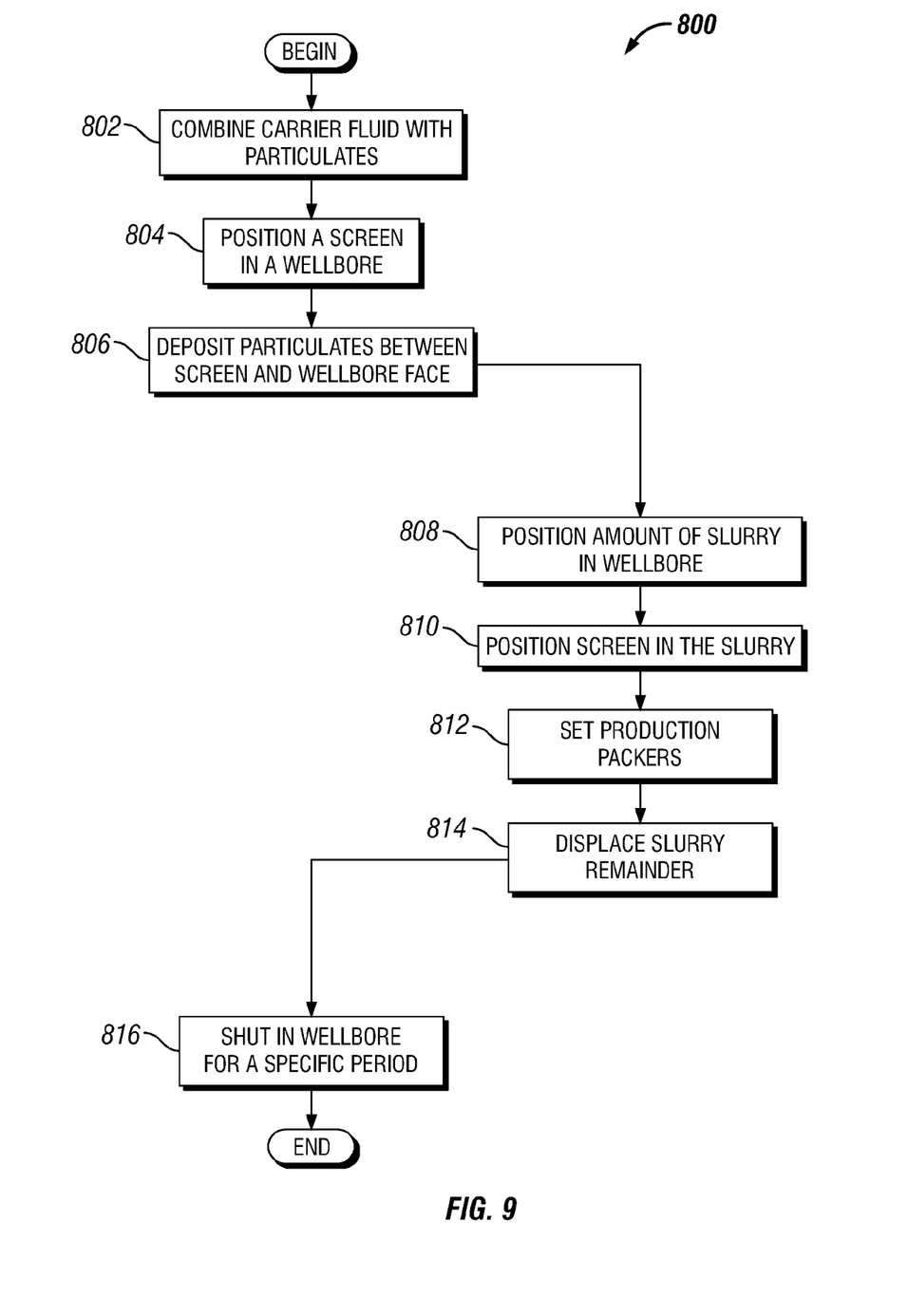
FIG. 9 is a schematic flow diagram of a technique for low damage gravel packing.

FIG. 9 is a schematic flow diagram of a technique 800 for low damage gravel packing. The technique 800 includes an operation 802 to combine a carrier fluid, a first amount of particulates, a second amount of particulates, and/or a third amount of particulates into a slurry. The first amount of particulates have a first average size distribution, the second amount of particulates have a second average size distribution, and the third amount of particulates have a third average size distribution. The first average size distribution is at least two times larger than the second average size distribution, and the first amount of particulates comprise non-deformable particulates. The second average size distribution is at least two times larger than the third average size distribution. The technique 800 further includes an operation 804 to position a screen in a wellbore, and an operation 806 to deposit each of the amounts of particulates between an outer surface of the screen and a surface of the wellbore.

As illustrated by FIGS. 1 and 9, in some embodiments, the depositing operation 806 includes operations 808 to position an amount of slurry in the wellbore, operations 810 to position the screen in the amount of slurry, operations 812 to set a production packer, and operations 814 to displace a slurry remainder inside the screen. In certain embodiments, the simplified operations (relative to currently available gravel packing operations) of placing the slurry 116 in the wellbore and the screen 112 into the slurry allow a very low carrier fluid 122 viscosifier loading and require a high particulate loading (as in certain embodiments excess carrier fluid 122 is not pumped into the formation of interest 106). In certain embodiments, the carrier fluid 122 includes viscosifiers at less than 20 lb/1000 gals, and total particulate loadings above 30 ppg. In certain embodiments, the slurry 116 includes particulate amounts (for the first, second, third, fourth, and/or fifth amount of particulates) and sizes such that the packed volume fraction (PVF) for the slurry 116 is greater than 0.75 PVF, or in some embodiments greater than 0.8 PVF.

Displacing the slurry remainder inside the screen includes circulating out particulates inside the screen 112, and/or flowing formation fluid from the formation of interest 106 and thereby carrying any slurry remainder out of the screen 112. In certain embodiments, at least one of the second and third particulate amounts comprise a degradable material, and the technique 800 further includes an operation 816 to shut in the wellbore for a specified time period. In certain embodiments, the specified time period may be a time period selected such that various degradation and breaking reactions have time to occur before flowing fluids out of the wellbore.

In certain embodiments, a method includes combining a carrier fluid, a first amount of particulates, and a second amount of particulates into a slurry. The first amount of particulates have a first average size distribution and the second amount of particulates have a second average size distribution, the first average size distribution is at least two times larger than the second average size distribution, and the first amount of particulates comprise non-deformable particulates. In certain embodiments, the method further includes positioning a screen in a wellbore, and circulating the slurry through the wellbore such that the first amount of particulates and the second amount of particulates are deposited on an outer surface of the screen.

In certain further embodiments, the method further includes combining a third amount of particulates with the slurry, wherein the third amount of particulates have a third average size distribution, wherein the second average size distribution is at least two times larger than the third average size distribution. In certain further embodiments, the second amount of particulates and the third amount of particulates comprise a degradable material. In certain further embodiments, at least one of the first amount of particulates, the second amount of particulates, and the third amount of particulates comprise a tackifying agent. In certain embodiments, the second amount of particulates and/or the third amount of particulates includes a reactive solid that reacts with a hydrolysis product of the degradable material. In certain embodiments, at least one of the particulate amounts includes particles with an aspect ratio of less than one.

In certain embodiments, a degradable material includes a wax, an oil-soluble resin, and/or a material soluble in hydrocarbons. In certain embodiments, at least one of the first amount of particulates and the second amount of particulates include a reactive solid that reacts with a hydrolysis product of the degradable material. In certain further embodiments, the reactive solid includes ground quartz, oil soluble resin, degradable rock salt, clay, and/or zeolite. In certain further embodiments, the reactive solid includes magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and sodium calcium magnesium polyphosphate glass.

In certain embodiments, the carrier fluid is a brine, and the sum of the mass of the particulates is at least about 20 pounds per gallon of carrier fluid. In certain embodiments, the carrier fluid includes a viscosifier being present in an amount less than 20 lb per 1000 gallons of carrier fluid, and the sum of the mass of the particulates is at least about 23 pounds per gallon of carrier fluid.

In certain embodiments, a method includes combining a carrier fluid, a first amount of particulates, and a second amount of particulates into a slurry, where the first amount of particulates have a first average size distribution and the second amount of particulates have a second average size distribution, wherein the first average size distribution is at least two times larger than the second average size distribution, and wherein the first amount of particulates comprise non-deformable particulates. In certain embodiments, the method further includes positioning a screen in a wellbore and depositing the first amount of particulates and the second amount of particulates between an outer surface of the screen and a surface of the wellbore.

In certain further embodiments, the depositing includes: positioning an amount of the slurry in the wellbore, positioning the screen in the amount of slurry, setting a production packer, and displacing a slurry remainder inside the screen. In certain further embodiments, the screen includes a crossover sleeve, and the depositing further includes positioning the screen in the wellbore, circulating the slurry through the screen from the outer surface to the inner surface of the screen through the crossover sleeve, and closing the crossover sleeve. In certain further embodiments, the second amount of particulates comprise a degradable material, further comprising shutting in the wellbore for a specified time period.

In certain embodiments, a system includes a slurry including a carrier fluid suspending a first amount of particulates and a second amount of particulates. The first amount of particulates have a first average size distribution and the second amount of particulates have a second average size distribution. The first average size distribution is between two times and fifteen times larger than the second average size distribution, and the first amount of particulates include non-deformable particulates. The system further includes a screen disposed in a wellbore, and means for depositing the first amount of particulates and the second amount of particulates between the screen and the wellbore.

In certain embodiments, the system further includes the carrier fluid suspending a third amount of particulates, where the third amount of particulates have a third average size distribution, and where the second average size distribution is between two times and fifteen times larger than the third average size distribution. In certain further embodiments, the carrier fluid further suspends a fourth amount of particulates, where the fourth amount of particulates have a fourth average size distribution, and where the third average size distribution is between two times and fifteen times larger than the fourth average size distribution. In certain further embodiments, the system includes a carrier fluid further suspending a fifth amount of particulates, where the fifth amount of particulates have a fifth average size distribution, and where the fourth average size distribution is between two times and fifteen times larger than the fifth average size distribution.

In certain embodiments, the system includes the second amount of particulates and/or the third amount of particulates including a degradable material. In certain embodiments, the degradable material includes at least one material selected from the list consisting of: a lactide, a glycolide, an aliphatic polyester, a poly (lactide), a poly (glycolide), a poly (ϵ-caprolactone), a poly (orthoester), a poly (hydroxybutyrate), an aliphatic polycarbonate, a poly (phosphazene), and a poly (anhydride). In certain embodiments, the degradable material includes at least one member selected from the list consisting of: a poly (saccharide), dextran, cellulose, chitin, chitosan, a protein, a poly (amino acid), a poly (ethylene oxide), and a copolymer including poly (lactic acid) and poly (glycolic acid). In certain embodiments, the degradable material includes a copolymer including a first moiety comprising at least one member selected from the functional groups consisting of a hydroxyl group, a carboxylic acid group, and a hydrocarboxylic acid group, the copolymer further including a second moiety comprising at least one of glycolic acid and lactic acid.

In certain embodiments, the carrier fluid includes a brine, and wherein the sum of the mass of the particulates is at least about 20 pounds per gallon of carrier fluid. In certain embodiments, the carrier fluid includes a viscosifier being present in an amount less than 20 lb per 1000 gallons of carrier fluid, and wherein the sum of the mass of the particulates is at least about 23 pounds per gallon of carrier fluid. In certain embodiments, the carrier fluid includes a hydratable gelling agent being present in an amount less than 18 lb gel per 1000 gallons of carrier fluid, and wherein the sum of the mass of the particulates is at least about 23 pounds per gallon of carrier fluid.

In certain embodiments, a system includes a slurry including a carrier fluid suspending a first amount of particulates, a second amount of particulates, and a third amount of particulates. In certain embodiments, the first amount of particulates has a first average particle volume, the second amount of particulates has a second average particle volume, and the third amount of particulates has a third average particle volume. In certain further embodiments, the first average particle volume includes an average particle volume between $3^3$ and $15^3$ times larger than the second average particle volume, and the second average particle volume includes an average particle volume between $3^3$ and $15^3$ times larger than the third average particle volume. In certain embodiments, the system further includes a screen disposed in a wellbore, and a means for depositing the first amount of particulates, the second amount of particulates, and the third amount of particulates between the screen and a surface of the wellbore.

In certain embodiments, the carrier fluid comprises one of a brine and a viscosifier being present in an amount less than 20 lb per 1000 gallons of carrier fluid, and the sum of the mass of the particulates is greater than 20 pounds per gallon of carrier fluid. In certain embodiments, the sum of the mass of the particulates is greater than 30 pounds per gallon of carrier fluid.

In certain embodiments, the first average size distribution comprises a median size of about 840 μm, wherein the second average size distribution comprises a median size of about 150 μm, and wherein the third average size distribution comprises a median size of about 15 μm, wherein each median size comprises a characteristic dimension. In certain embodiments, the system further includes the first amount of particulates, second amount of particulates, and third amount of particulates have a combined dry packing volume fraction greater than 0.75 or greater than 0.8. In certain embodiments, the means for depositing the first amount of particulates, the second amount of particulates, and the third amount of particulates between the screen and a surface of the wellbore includes means for positioning the slurry in the wellbore, means for positioning the screen in the slurry, and means for removing remainder carrier fluid from the slurry.

EXAMPLES

Example 1

Comparative Example

A high solid content fluid slurry was prepared using sand and polyglycolic acid (two different sizes). The composition of the slurry is shown in Table 1. The slurry before and after the slurry was aged at 250° F. for 24 hours was photographed. Visual tests indicate that the gravel occupies only 75% of the initial volume. That is, gravel occupies only 75 percent of the initial volume after PGA hydrolysis.

TABLE 1

Composition of high solid content fluid

| Component | Volume (ml) | Weight (g) |
| --- | --- | --- |
| Sand (800 m) | 95.71 | 253.64 |
| PGA (150 m) | 15.71 | 24.04 |
| PGA (8 m) | 31.43 | 48.09 |
| DI water | 57.14 | 57.14 |

The following examples illustrate ways to increase the pack efficiency to 100%.

Example 2

Two elastomer coupons of oil swellable elastomer were immersed in water and diesel. The coupon labeled 1 was immersed in water and the coupon labeled 2 was immersed in diesel. The coupons were aged for 120 hours at room temperature and photographed at 0, 24 and 120 hours. The coupon immersed in diesel expanded significantly—The volume change of the two coupons is shown in Table 2. After 120 hours, the coupon immersed in brine showed a 4 percent volume expansion and the coupon immersed in diesel showed 128 percent expansion.

TABLE 2

Elastomer expansion in water and diesel.

| Solvent | Time (h) | L (cm) | W (cm) | T (cm) | Vol (cm3) | Expansion |
| --- | --- | --- | --- | --- | --- | --- |
| Brine | 0 | 2.20 | 1.77 | 0.22 | 0.86 | — |
|  | 24 | 2.2 | 1.78 | 0.222 | 0.87 | 1% |
|  | 120 | 2.22 | 1.787 | 0.225 | 0.89 | 4% |
| Diesel | 0 | 2.15 | 1.65 | 0.22 | 0.78 | — |
|  | 24 | 2.464 | 1.919 | 0.29 | 1.37 | 75% |
|  | 120 | 2.811 | 2.081 | 0.305 | 1.78 | 128% |

Example 3

Two different mixtures of sand and gas-filled microspheres were prepared using the composition shown in Table 3. The mixture was filled up to 110 ml in a 200 ml glass bottle and distilled water was added to the mixture so that it occupies the void volume in the mixture. The two mixtures were aged at 200° F. for 24 hrs. The pictures of the two mixtures before and after ageing at 200° F. were photographed. The photos show that the pack has expanded to a final volume of 125 ml with 6 g of gas-filled microspheres in the mixture. This is a 12 percent increase of gravel pack volume from its initial state.

TABLE 3

Composition of the mixtures

| Component | Mixture 1 (g) | Mixture 2 (g) |
| --- | --- | --- |
| Sand (800 μm) | 177.6 | 177.6 |
| Expancel-DU ™ (13.5 μm) | 4 | 6 |

Table 4 summarizes of expansion seen with different amounts of EXPANCEL™ in the pack.

TABLE 4

Volume change with EXPANCEL ™ particles

| Component | Initial Volume (ml) | Final Volume (ml) | % Expansion |
| --- | --- | --- | --- |
| Mixture 1 (4 g EXPANCEL ™) | 110 | 110 | 0 |
| Mixture 2 (6 g EXPANCEL ™) | 110 | 125 | 12 |

The percentage of expansion can be tailored by changing the amount of expandable material in the pack.

Example 4

Two different samples of magnesium oxide having a mean diameter of 19 μm and 863 μm were observed to study their expansion properties. A 20 g sample of each size is mixed in distilled water and the samples were aged at 250° F. for 72 hours. Photographs of the samples before and after the ageing tests show that the volume occupied by the solid has increased after heating the sample at 250° F. The relative increase in volume for each of the samples is shown in Table 5.

TABLE 5

Expansion of MgO

| Size of MgO | Initial Volume | Final volume | % Expansion |
| --- | --- | --- | --- |
| 19 μm | 13 | 28 | 115.38 |
| 863 μm | 25 | 55 | 120.00 |

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:
1. A method for treating a subterranean formation penetrated by a wellbore, comprising:
   combining a carrier fluid, a first amount of particulates, a second amount of particulates and a third amount of particulates into a slurry;
   wherein the first amount of particulates have a first average size distribution and the second amount of particulates have a second average size distribution, and wherein at least one of the first amount of particulates and the second amount of particulates comprise an expanding material, and wherein the third amount of particulates comprise a degradable material;

placing the slurry in the wellbore;

lowering a screen into the slurry;

forming a gravel pack in an annulus between the screen and a surface of the wellbore;

degrading the degradable material to increase permeability of the gravel pack and reduce a volume of the gravel pack;

expanding the expandable material to increase a volume of the gravel pack in the wellbore; and thereafter injecting or producing a fluid through the gravel pack.

2. The method of claim 1, wherein the expanding material comprises swellable elastomers, temperature expandable particles, metal oxide, or a combination thereof.

3. The method of claim 1, wherein the expanding material comprises styrene butadiene rubber (SBR), styrene butadiene block copolymers, styrene isoprene copolymer, acrylate elastomers, neoprene elastomers, nitrile elastomers, vinyl acetate copolymers and blends of EVA, and polyurethane elastomers.

4. The method of claim 1, wherein the expanding material comprises water swellable elastomers and/or brine swellable elastomers.

5. The method of claim 1, wherein the expanding material comprises maleic acid, grafted styrene butadiene elastomers, and/or acrylic acid grafted elastomers.

6. The method of claim 1, wherein the expanding material comprises metal particles.

7. The method of claim 1, wherein the expanding material comprises an oxide of Ca, Mn, Ni, and/or Fe.

8. The method of claim 1, wherein a sum of the first amount of particulates and second amount of particulates exceeds thirty pounds per gallon of carrier fluid.

9. The method of claim 1, wherein the slurry comprises solids having a packed volume fraction greater than 0.8.

10. The method of claim 1, wherein the placing comprises positioning an amount of the slurry in the wellbore, positioning the screen in the amount of slurry, setting a production packer, and displacing a slurry remainder inside the screen.

11. The method of claim 1, wherein the screen includes a crossover port, wherein the depositing comprises positioning the screen in the wellbore, and placing the slurry through the crossover port into the annulus of the wellbore and the screen.

12. The method of claim 1, wherein the slurry is placed in an annulus of the screen and the wellbore by circulating the slurry from the bottom of the screen into the screen-wellbore annulus.

13. The method of claim 1, wherein the second amount of particulates comprise a degradable material, further comprising shutting in the wellbore for a specified time period.

14. The method of claim 1, wherein the expanding material comprises gas-filled particles.

15. The method of claim 1, wherein reducing the volume of the gravel pack exposes at least a portion of the screen and wherein increasing the volume of the gravel pack uniformly exposes the screen to the gravel pack.

16. A method of treating a subterranean formation penetrated by a wellbore, comprising:

combining a carrier fluid, a first amount of particulates, a second amount of particulates, and a third amount of particulates into a slurry;

wherein the first amount of particulates have a first average size distribution, the second amount of particulates have a second average size distribution, and the third amount of particulates have a third average size distribution, wherein the first average size distribution is at least two times larger than the second average size distribution, and wherein second average size distribution is at least two times larger than the third average size distribution;

wherein at least one of the second amount of particulates and the third amount of particulates comprise an expanding material, and wherein at least one of the second amount of particulates and the third amount of particulates comprise a degradable material;

positioning a screen in a wellbore;

circulating the slurry through the wellbore such that the first amount of particulates and the second amount of particulates and the third amount of particulates are deposited on an outer surface of the screen;

forming a gravel pack in an annulus between the screen and a surface of the wellbore;

degrading the degradable material to increase permeability of the gravel pack and reduce a volume of the gravel pack;

expanding the expandable material to increase a volume of the gravel pack in the wellbore; and thereafter injecting or producing a fluid through the gravel pack.

17. The method of claim 16, wherein the circulating comprises placing the slurry in the wellbore and positioning the screen in the slurry.

18. The method of claim 16, wherein at least one of the first amount of particulates, the second amount of particulates, and the third amount of particulates comprise a tackifying agent.

19. The method of claim 16, wherein the degradable material comprises at least one member selected from the group consisting of a wax, an oil-soluble resin, and a material soluble in hydrocarbons.

20. The method of claim 16, wherein the degradable material comprises lactide, glycolide, aliphatic polyester, poly (lactide), poly (glycolide), poly (ε-caprolactone), poly (orthoester), poly (hydroxybutyrate), aliphatic polycarbonate, poly (phosphazene), poly (anhydride), poly (saccharide), dextran, cellulose, chitin, chitosan, protein, poly (amino acid), poly (ethylene oxide), and copolymers including poly (lactic acids), poly (glycolic acids) or a combination thereof.

21. The method of claim 16, wherein at least one of the second amount of particulates and the third amount of particulates comprise particles with an aspect ratio of less than one.

22. The method of claim 16, wherein at least one of the second amount of particulates and the third amount of particulates comprises at least one member selected from the group consisting of ground quartz, oil soluble resin, degradable rock salt, clay, and zeolite.

23. The method of claim 16, wherein at least one of the second amount of particulates and the third amount of particulates comprises at least one member selected from the group consisting of magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, sodium calcium magnesium polyphosphate glass, lactide, glycolide, aliphatic polyester, poly (lactide), poly (glycolide), poly (ε-caprolactone), poly (orthoester), poly (hydroxybutyrate), aliphatic polycarbonate, poly (phosphazene), poly (anhydride), poly (saccharide), dextran, cellulose, chitin, chitosan, protein, poly (amino acid), poly (ethylene oxide), copolymers including poly (lactic acids), poly (glycolic acids), and combinations thereof.

24. The method of claim 16, wherein the carrier fluid comprises a brine or oil in water or water in oil emulsion, and wherein the sum of the mass of the particulates is at least about 20 pounds per gallon of carrier fluid.

25. The method of claim 16, wherein the carrier fluid comprises a viscosifier in an amount less than 20 lb per 1000 gallons of carrier fluid, and wherein the sum of the mass of the particulates is at least about 23 pounds per gallon of carrier fluid.

26. The method of claim 16, wherein the expanding material comprises a swellable elastomer and further comprising contacting the slurry after it is placed with an oil or brine so to accelerate the swelling of the swellable elastomer.

27. The method of claim 16, wherein reducing the volume of the gravel pack exposes at least a portion of the screen and wherein increasing the volume of the gravel pack uniformly exposes the screen to the gravel pack.

* * * * *